Patented Oct. 10, 1950

2,524,960

UNITED STATES PATENT OFFICE 2,524,960

SAFETY GLASS

Emile Clement Cottet and René Louis Fernand Chazal, Lyon, France, assignors to Societe des Usines Chimiques Rhone-Poulenc, Paris, France, a French body corporate No Drawing. Application May 8, 1946, Serial No. 668,313. In France April 30, 1945

Section 1, Public Law 690, August 8, 1946
Patent expires April 30, 1965

2 Claims. (Cl. 154—2.77)

This invention is for improvements in or relating to so-called "safety-glass" of the kind comprising juxtaposed sheets of glass having between them a sheet, or inter-leaf, of transparent plastic material, the whole being united to form an integral unit.

It is known to employ as the intermediate sheet or inter-leaf either polyvinyl alcohol or a derivative thereof which is soluble or which swells in water. Such inter-leaves are characterised by an extraordinarily high mechanical resistance, which is maintained over a very wide range of temperature, and thus assure safety under all practical conditions of use of reinforced glass, notably in automobiles and aeroplanes.

However, the use of polyvinyl alcohol and its derivatives which dissolve or swell in water for this purpose has not been developed on an industrial scale for the reason that it has not been possible heretofore to obtain a satisfactory bond between these particular inter-leaf materials and the adjacent glass sheets.

According to the present invention, it has now been discovered that excellent adhesion between glass sheets and inter-leaves based upon polyvinyl alcohol or a derivative thereof which dissolves or swells in water can be secured by using as adhesives inorganic salts or organic esters of silicic acid.

In carrying out the process of the present invention for the manufacture of safety glass, the new adhesives can be used either in the pure state or in admixture with a carrier in the form of solutions either in the assembly bath or by spraying onto the surface of the glass and of the plastic inter-leaf respectively, or again the adhesives may be incorporated in the plastic inter-leaf itself. The polyvinyl alcohol or derivative constituting the inter-leaf may be used in the form of films obtained by casting from solutions in suitable solvents or in the form of sliced or extruded sheets. Further, it should be understood that the inter-leaf material may be used in the pure state or with the addition of plasticisers.

Amongst the derivatives of polyvinyl alcohol used in accordance with this invention, alcohol esters with a saponification value of 50-200 and with a high degree of polymerisation are particularly useful.

The present invention is illustrated by the following non-limitative examples:

Example 1

On to a polished surface there is poured an aqueous solution of the following composition:

75 parts of water
5 parts of glycerine, and
25 parts of polyvinyl alcohol, which is obtained by the partial saponification of a polyvinyl acetate of high viscosity, the saponification being so controlled that the reaction product has a saponification value of 80.

The thickness of the casting is so regulated that, after evaporation of the water, there remains on the support a film of polyvinyl alcohol which is 0.25 mm. thick. This film is assembled with the sheets of glass in the usual manner in a bath at 15° C. containing a mixture of 95 parts of water with 5 parts of methyl silicate (the use of methyl silicate in this case is particularly advantageous, since this ester is soluble in water).

During this assembly in the bath, the polyvinyl alcohol inter-leaf absorbs a quantity of the bath mixture representing 25% of its initial weight. On leaving the bath, the assembled unit is pressed for one minute under 10 kg. per sq. cm. in a press with platens warmed to 100° C. and fitted with an elastic envelope, and then heated in an autoclave for 30 minutes at 125° C. under a pressure of 7 kg./sq. cm. After cooling under pressure in the autoclave, a faultless safety glass is obtained, the edges of which are then protected by sealing with a water-repellent luting. The safety glass so prepared is characterised by excellent resistance to shock, persisting even at very low temperatures. At —40° C., for example, the adhesion of the inter-leaf to the glass is excellent, and the unit stands up without fracture to the impact of a 325-gramme sphere falling from a height of 1.25 metres.

Example 2

A polyvinyl alcohol film 0.25 mm. thick is prepared by the method of Example 1. This film is assembled with juxtaposed sheets of glass in the usual manner while immersed in a bath consisting of a mixture of 95 parts of water and 5 parts of sodium silicate. On leaving the assembly bath, the unit is pressed between the platens of a press provided with an elastic envelope and heated to 125° C. for 10 minutes under a pressure of 22 kg./sq. cm. In this way there is obtained a safety glass in which there is good adhesion between the inter-leaf and the glass.

If, on the other hand, the same film is assembled between glass sheets under the same conditions, but in a bath containing water only, the inter-leaf in the finished product does not adhere to the glass, and even a weak shock will cause sharp splintering.

Example 3

A varnish which can be applied with a spray gun is prepared, consisting of:

5 parts of polyvinyl butyral containing 10% of polyvinyl alcohol
95 parts of solvent consisting of:
    60 parts of benzene
    20 parts of ethyl lactate
    15 parts of butyl silicate.

This varnish is sprayed with a gun onto two glass sheets to a thickness of 300 g. per sq. m. and then left to dry on the glass for 15 minutes at 45–50° C. Then a film of polyvinyl alcohol, prepared as in Example 1, is introduced between the glass sheets thus treated and the product assembled under pressure as described in Example 2. The safety glass thus prepared has a very resistant inter-leaf which adheres perfectly to the glass. If so desired, the edge of the glass may be protected by a water-repellent luting.

Example 4

Between two sheets of glass there is mounted a film of the following composition:

80 parts of polyvinyl alcohol
20 parts of monohydroxythioxane of which the surfaces have previously been covered, by spraying or brushing, with a thin layer of methyl silicate. The assembled unit is then subjected for 25 minutes at 150° C. to a pressure of 12 kg./sq. cm. in a press the heated platens of which are enclosed in an elastic envelope. In this way there is obtained a safety glass in which the plastic inter-leaf has excellent adhesion to the glass. If, however, a safety glass unit is produced under the same conditions, but without pre-treatment of the surface of the polyvinyl alcohol film with methyl silicate, the inter-leaf does not adhere to the glass sheets.

We claim:

1. A safety-glass unit comprising two juxtaposed glass sheets and an intermediate film of polyvinyl alcohol, wherein the bond between the intermediate film and the facing glass surfaces is secured by an adhesive comprising water-soluble methyl silicate.

2. A method of uniting a film of polyvinyl alcohol to a glass surface, which method comprises applying to at least one of the two jointing surfaces a coating of water-soluble methyl silicate, contacting the surfaces to be united and subjecting the whole to heat and pressure.

EMILE CLÉMENT COTTET.
RENÉ LOUIS FERNAND CHAZAL.

REFERENCES CITED

The following references are of record in the file of this patent:

UNITED STATES PATENTS

| Number | Name | Date |
|---|---|---|
| 2,125,374 | Herrmann et al. | Aug. 2, 1938 |
| 2,299,552 | McGregor et al. | Oct. 20, 1942 |
| 2,317,891 | Dennison | Apr. 27, 1943 |
| 2,404,426 | Bechtold | July 15, 1944 |

FOREIGN PATENTS

| Number | Country | Date |
|---|---|---|
| 17,007 of 1928 | Australia | Nov. 26, 1928 |